United States Patent [19]
De Bonet

[11] Patent Number: 5,905,894
[45] Date of Patent: May 18, 1999

[54] META-PROGRAMMING METHODS AND APPARATUS

[75] Inventor: Jeremy S. De Bonet, Cambridge, Mass.

[73] Assignee: Microsoft Corporation, Redmond, Wash.

[21] Appl. No.: 08/959,867

[22] Filed: Oct. 29, 1997

[51] Int. Cl.$^6$ .................................................. G06F 9/445
[52] U.S. Cl. .............................................................. 395/705
[58] Field of Search ............................................. 395/705

[56] References Cited

U.S. PATENT DOCUMENTS 5,835,771  11/1998  Veldhuizen ............................ 395/705

OTHER PUBLICATIONS

H.M. Deitel and P.J. Deitel, C++ How to Program, pp. 854–861, 1998.
Robert Lafore, The Waite Group's C Programming Using Turbo C++, pp. 157–167, 1993.
MICROSOFT CORPORATION, "Introduction to C++ A Short Guide to Programming in C++ ", pp. 1–240 (1996).

*Primary Examiner*—Robert W. Downs
*Assistant Examiner*—Wei Zhen
*Attorney, Agent, or Firm*—Michaelson & Wallace; Peter L. Michaelson; Michael P. Straub

[57] ABSTRACT

The described programming techniques allow for the passing of code arguments to functions, referred to as meta-functions, at compile time through the use of compiler directives. Methods for implementing functions, referred to as meta-loops, which allow for a block of code to be repeated a variable number of times at compile time are also described. The programming methods of the present invention allow for greater code reuse since code arguments can be used to modify the functionality of a meta-function thereby altering its functionality. Meta-functions and meta-loops can also be used to generate a group of functions which share common behaviors. In accordance with the present invention the common behaviors are produced via the use of a common meta-function. This allows the behavior of a group of functions to be altered. This reduces the time and expense associated with creating and maintaining libraries of functions with shared behaviors. Because the programming methods of the present invention can be implemented using compiler commands and functionality supported by existing compiled languages such as C++ they serve to supplement and argument the functionality of existing compiled languages without requiring modifications thereto.

31 Claims, 11 Drawing Sheets

802

```
Meta_forEx1.h
// Counts from 1 to
//MetaLoopEnd assuming that
//MetaLoopEnd is less than or
//equal to the preselected
//maximum number of loops,
//MaxNumLoops, supported by
//Meta_forEx1.h if MetaLoopEnd ≥ 1         //LOOP ITERATION 1
    #define do1 Label (1)
#else
    #define do1 if MetaLoopEnd ≥ 2         //LOOP ITERATION 2
    #define do2 Label (2)
#else
    #define do2 if MetaLoopEnd ≥ 3         //LOOP ITERATION 3
    #define do3 Label (3)
#else
    #define do3
        o           o           o
        o           o           o
        o           o           o if MetaLoopEnd ≥ MaxNumLoops //
    #define doMaxNumLoops Label(MaxNumLoops)
#else
    #define doMaxNumLoops
 do1
 do2
 do3
   o
   o
 doMaxNumLoops
```

804

```
Main.cpp

805 ⎰ #define MetaLoopEnd 3
    ⎨ #define Label(c) {printf("%s", lin##c)}
    ⎱ #include Meta_forEx1.h 807 ⎰ #define MetaLoopEnd 5
    ⎨ #define Label(c) {printf("%s", lin##c)}
    ⎱ #include Meta_forEx1.h
```

*FIG.8*

META-PROGRAMMING METHODS AND APPARATUS

FIELD OF THE INVENTION

The present invention is directed to the control of computer systems and, more particularly, to methods and apparatus for increasing the functionality of existing programming languages.

BACKGROUND OF THE INVENTION

Computer programs are used to control computers to perform various operations, e.g., image processing operations. A computer program generally includes many lines of computer code, e.g., computer instructions, which are required to control a computer to perform a desired operation. Computer programs are frequently written in a high level language such as ANSI C or C++. After a computer program is written using, e.g., an editing program, the program is then compiled using a compiler. Object code produced as a result of the compilation process is then used to control a computer to perform the desired operation for which the program was written.

The cost of developing a new computer program to perform a desired task is related to, inter alia, the amount of new code that must be written to create the computer program. This is because a programmer must spend time writing and then debugging the new code.

Various techniques have been used to reduce the amount of new code that must be written to develop a new computer program. Some of these techniques are directed to minimizing the amount of code that must be written to perform a desired operation. For example, many high level languages support the use of "for" and "while" loops which include conditional statements performed at run time. Similarly, many high level languages support function calls which involve going to memory locations where a function is stored at run time.

For most applications, the time required to determine the outcome of a conditional statement, or to make a function call at run time, is not very significant. However, in speed sensitive operations, e.g., real time image processing operations, the use of conditional statements and run time function calls can significantly impact performance. Image processing applications are often particularly sensitive to the use of operations, e.g., runtime function calls, that introduce even small execution time delays. This is because image processing routines often involve performing nearly identical operations repetitively, e.g., on several hundred thousand pixels, to process a single image. Accordingly, in such speed sensitive operations, it is desirable to avoid the use of conditional loops and run time function calls, even if this means having to duplicate many thousands of lines of code to avoid the delays that would otherwise be introduced by the use of conditional loops and run time function calls.

Other techniques directed to reducing the amount of new code that must be written for a new program often involve directly incorporating one or more previously written functions from, e.g., function libraries into the program being written. Compiler directives are frequently used for this purpose. For example, in the C programming language, several compiler directives are supported. These are frequently identified by the placement of a # sign at the beginning of the directive. The C programming language supports, e.g., a # include directive which results in the inclusion into a program of the contents of a specified file, a #define directive which results in a text substitution operation being performed, and a ## directive which causes the compiler to concatenate parameters located directly before and after the ## directive.

Because compiler directives are performed at compile time, as opposed to run time, compiler directives included in a program need not affect run time performance.

In addition to supporting compiler directives, many high level languages have attempted to make functions more general in terms of their applicability so that a single function can be used with, e.g., a variety of parameters of different types, e.g., integer, character or floating point type. The C programming language's template function is an example of a function with a reasonable degree of argument type flexibility.

Unfortunately, certain highly desirable functionalities remain missing from known high level compiled languages that would greatly enhance their ability to reuse existing code. In particular, known compiled languages do not provide any direct mechanism for generating different functions by providing different blocks of code as an argument to a general function definition at compile time. Additionally, the known compiled languages, such as the C programming language, provide no way to unroll run-time loops at compile time by copying the inner loop function code the proper number of times that it would otherwise be repeated at runtime within the runtime loop.

Because of the above described shortcomings of the known high level compiled languages some real-time compiled programs often include large amounts of code which is manually repeated, e.g., copied using a text editor. This frequently results in a large codebase which is both difficult to debug and maintain.

In view of the problems associated with the known high level compiled languages, there is a need for new methods and apparatus which will increase the amount of code that can be reused in a compiled language. In particular, it is desirable that such new methods support the passing of code segments as arguments to function definitions at compile time. Code segments passed as arguments will be referred to herein as code arguments. The ability to pass code arguments to functions would make it possible to modify the functionality of an existing library function. In addition, the new methods should be capable of generating code which unrolls runtime loops at compile time. Furthermore, any new programming methods should be compatible with one or more existing computer programming languages so that they can be implemented without requiring modifications to existing compilers.

SUMMARY OF THE PRESENT INVENTION

While the present invention is generally directed to methods and apparatus for controlling computer systems, specific features of the present invention are directed to new programming methods which facilitate the generation, maintenance and reuse of computer code. The programming methods of the present invention facilitate the reuse of computer code while producing compiled programs which, in many cases, can be as efficient, in terms of execution speed, as hand written code. Because the programming techniques of the present invention can be used to increase the functionality of existing programming languages, they may be described as meta-programming techniques, e.g., which can be used to produce meta-functions which in many ways are more flexible than standard functions.

The present invention is particularly well suited to processor intensive computer applications where execution time is important, e.g., real time image processing applications.

In accordance with a meta-function programming feature of the present invention, code arguments are passed to function routines, e.g., meta-functions, at compile time. The code argument can be used to alter the functionality of the meta-function making meta-functions more flexible than conventional functions which can not receive a block of code as an argument. Thus, meta-functions include one or more undefined labels representing code arguments. Meta-functions can be stored in separate files which can be included into subsequently generated program segments. To use the meta-function a program segment is generated which defines the undefined meta-function code argument labels to the desired code arguments. A # define directive may be used for this purpose. After the code argument labels are defined, a compiler directive instructing a compiler to include the meta-function is placed in the program segment to instantiate, i.e., include, the meta-function. A # include compiler directive may be used for this purpose. The generated program segment may also optionally include a command redefining the name of the meta-function.

Once one or more program segments are generated in the above described manner, they can be arranged into a computer program which can then be compiled. At compilation time, the compiler will directly incorporate the meta-function and code arguments into the program thereby avoiding the need to perform run time function calls to execute the meta-function code.

Thus, through the use of conventional compiler directives in a novel manner, the meta-function programming feature of the present invention overcomes the inability of known compiled programming languages to pass code arguments to functions. In doing so, the present invention reduces or eliminates the need to tediously repeat many thousands of lines of code when writing many processor intensive applications. It also reduces the amount of code that must be maintained providing for faster debugging and easier maintenance of a code library.

Another feature of the present invention is directed to a specific type of meta-function referred to herein as a meta-loop. A meta-loop is a function which can directly incorporate a block of code as an argument a variable number of times specified, e.g., just before compile time. As with a meta-function, the meta-loop programming technique of the present invention involves generating a function routine which includes one or more undefined labels representing code arguments. In addition to code argument labels, the meta-loop includes one or more meta-loop control parameter labels and conditional compiler directives. The conditional compiler directives are used in conjunction with the control parameter labels to determine the number of times a code block is to be included in the main program. After generation of a meta-loop, it is stored, e.g., in a file bearing the meta-loop's name.

The meta-loop function of the present invention is used by generating a program segment which includes one or more compiler directives defining the code argument and control parameter labels included in the meta-loop followed by a compiler directive, e.g., a # include directive, to instantiate the meta-loop into the program segment. The program segment may be included in a program with other segments to form a program which performs, e.g., a desired image processing operation.

In accordance with the present invention, function loops may be unrolled by copying the inner loop function code the proper number of times that it would otherwise be repeated at runtime within the runtime loop. Thus, the present invention advantageously reduces or avoids the delays associated with conditional statements performed at program execution time.

Additional compiler directives, e.g., the concatenate ## compiler preprocessor directives, and templated arguments can also be used in accordance with the present invention to increase the versatility of the meta-function and meta-loop programming techniques of the present invention.

One feature of the present invention is directed to the combination of the above discussed meta-function and meta-loop programming techniques to produce extremely versatile meta-functions.

The above described programming techniques can be used to generate one or more general purpose functions. Groups of functions with common shared behaviors can then be generated from the general purpose functions. In this manner, code reuse is increased, the size of code databases which must be maintained for particular application, e.g., an image processing application, is reduced, and efficiencies in program execution time are achieved by avoiding run time function calls and by reducing or eliminating run time conditional loops. Furthermore, this functionality is achieved without requiring modifications to existing programming languages or compilers, e.g., the C++ programming language and existing C++ compilers.

Numerous additional features and aspects of the methods and apparatus of the present invention are set forth in the detailed description that follows.

BRIEF DESCRIPTION OF THE DRAWINGS

FIG. 8 illustrates code for implementing a meta-loop in accordance with the present invention and a main program utilizing the illustrated meta-loop.

DETAILED DESCRIPTION

As discussed above, the present invention is directed to the control of computer systems and, more particularly, to meta-programming methods and apparatus. The meta-programming methods of the present invention can be used to generate a computer program for, e.g., controlling a computer to perform processor intensive applications such as real time image processing operations.

Figure 1:
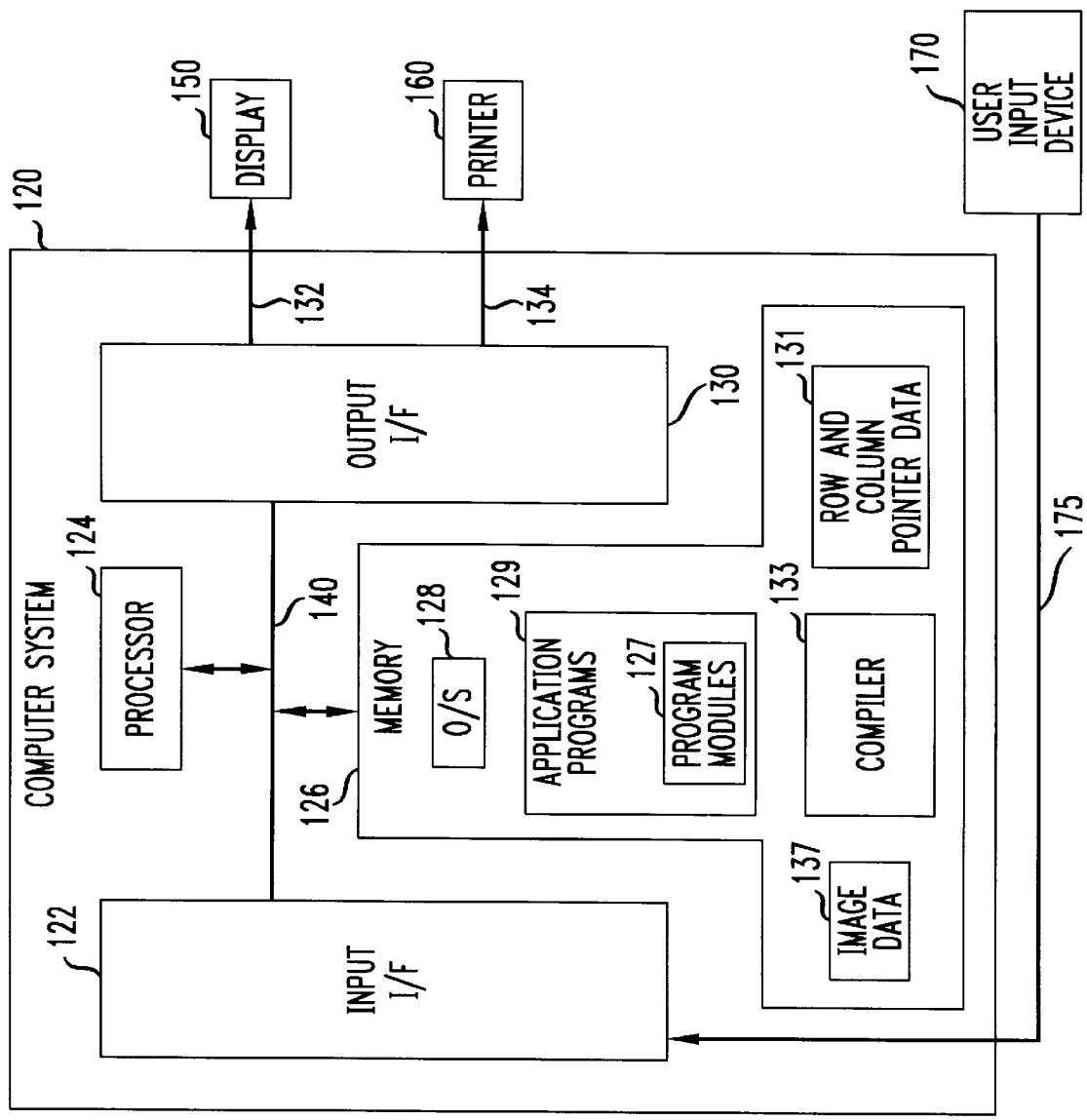
FIG. 1 illustrates a system implemented in accordance with one exemplary embodiment of the present invention.

FIG. 1, illustrates a block diagram of a system 100, suitable for image processing and other computer applications, as an exemplary embodiment of the present invention. As illustrated, the system 100 includes a computer system 120 which itself comprises an input interface 122, a processor 124, a memory 126 and an output interface 130, all conventionally interconnected by bus 140. Memory 126, which generally includes different modalities, all of which are not specifically shown for simplicity, may be implemented using random access memory (RAM) and/or hard disk storage and/or other removable media drives, such as CD-ROM drives, which are capable of reading information stored on a computer-readable medium such as a CD-ROM. In accordance with the present invention the memory 126 stores an operating system (O/S) 128, image data 137, application programs 129, program modules 127 which may be part of one or more application programs, image row and column pointer data 131, and a compiler 133. O/S 128 may illustratively constitute the WINDOWS NT operating system while the compiler 133 may illustratively constitute a visual C++ compiler, both of which are presently available from the Microsoft Corporation of Redmond, Wash.

Input interface 122 electrically connects and interfaces user input device 170, such as a keyboard and mouse, to computer system 120. A computer programmer can input and edit computer code via the user input device 170 to generate program segments and modules which can be stored in the memory 126. Via the input device 170, the computer programmer can also control the computer system 120 to compile generated programs and to execute the programs on the processor 124 as desired.

Display 150, such as a conventional color monitor, and printer 160, such as a conventional laser printer or other well-known printer, are connected, via leads 132 and 134, respectively, to output interface 130. The display 150 can be used for displaying, e.g., application programs, program modules or program segments and/or images while the printer 160 can be used for generating printed versions thereof. Output interface 130 provides requisite circuitry to electrically connect and interface display 150 and printer 160 to the computer system 120.

In this exemplary embodiment illustrating an image processing application, images typically stored on a hard disk (not shown) may be processed by processor 124 under control of one or more image processing application programs 129, e.g., generated in accordance with the programming methods of the present invention.

A user can invoke one or more of the application programs or the compiler 133 through appropriate commands entered via input device 170 and/or in response to a program icon appearing on display 150.

One exemplary embodiment of the present invention is directed to functions implemented in accordance with the present invention, referred to herein as meta-functions, which can receive variable blocks of code as arguments, in addition to receiving conventional function arguments, e.g., template and parameter arguments such as integer, floating point and character arguments.

As discussed above, it is desirable to be able to write functions which can directly accept code arguments. This allows behaviors which are shared between a group of functions to be generated by code which is also shared. In addition, it permits for the functionality of a function to be altered via the code argument passed to the meta-function. Accordingly, the present invention permits a group of functions with shared behaviors to be generated by passing different code arguments to a single meta-function. Thus, like a regular C++ function, a meta-function can take input arguments. However, unlike a regular function, meta-functions directly incorporate code which can be passed into the function as an argument at compile time. This avoids the execution time overhead associated with a function call.

An example of a hypothetical syntax for a meta-function call could be:

```
meta-function declaration:
    meta_function meta-function-name (FunctionName,
    code-argument-list)
    (template<template-argument-list>)
    return-value FunctionName (function-argument-list)
    {
        [Statements*\code-arguments*\function-arguments*]
    }
for example:
    meta_function PrintCalculation (FunctionName, CodeArgument1,
CodeArgument2)
    template <class TYPE1, class TYPE2>
    void FunctionName (Type1 variable1, Type2 variable 2)
    {
        // this is an example of a meta function which
        // uses templated arguments, as well as code arguments
        // print the original values
        cout << variable1 <<""<< variable2 <<"";
        // apply some unknown block of code
        CodeArgument1;
        // print the intermediate values
        cout << variable1 <<""<< variable2 <<"";
        // apply another unknown block of code
        CodeArgument2;
        // print the final values
        cout << variable1 <<""<< variable2 << EOL;
    }
```

After such a function is created, e.g., in a separate file bearing the name of the function, it can be instantiated, i.e., included, in a program by making the following function call:

```
PrintCalculation(SumSqrAndSqrtSumSqr,
    { variable1 *= variable1; variable2* = variable2; },
    { variable1 += variable2; variable2 = sqrt(variable1);   }};
```

Though the above syntax and functionality is desirable, it unfortunately is not supported by existing compiled languages or existing compilers, e.g., the C++ language and C++ compilers. Incorporating such a change into an existing language such as C++ would involve changing the C++ standard and rewriting C++ and C++ compilers. To avoid the need for such alterations to the C++ language it is highly desirable to provide the above described functionality as a meta-function, i.e., one that uses existing C++ functionality to provide even greater functionality and programming flexibility.

The methods of the present invention achieve the above described functionality without requiring alterations to existing languages by using compiler preprocessor directives such as the "# define" and "# include" directives supported by many existing compilers including existing C++ compilers. In accordance with the present invention, by placing the meta-function in its own file and then using a series of # defines followed by a # include directive, e.g., in the main program, the functionality afforded by the above syntax is generally achieved.

Figure 2A:
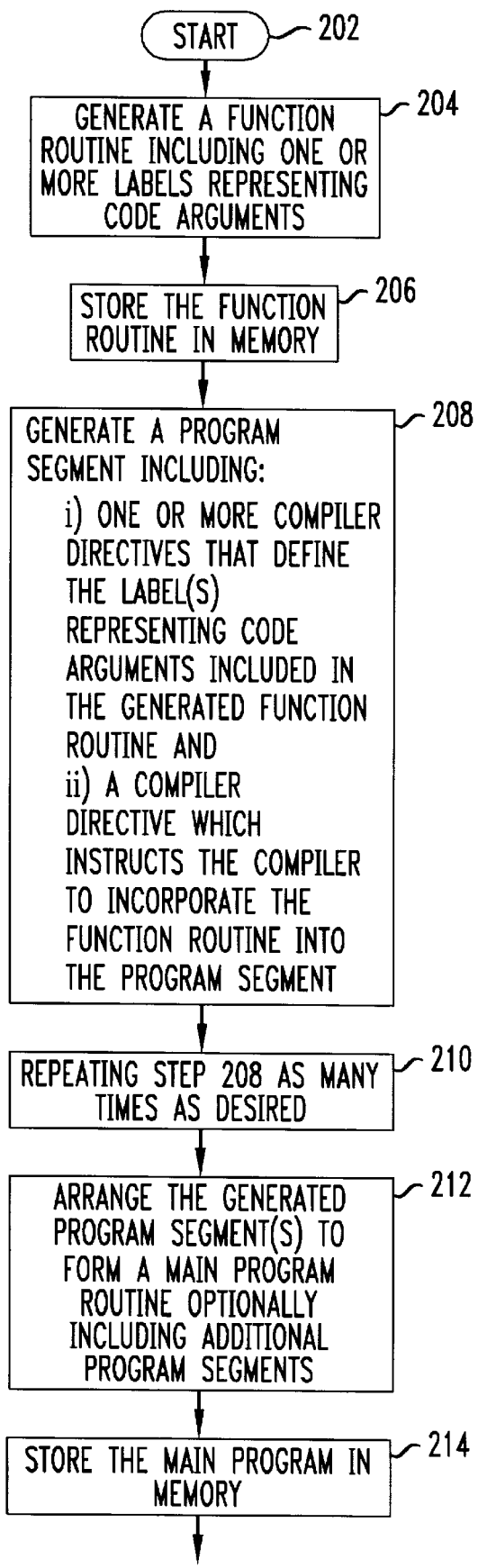
FIGS. 2A and 2B collectively illustrate steps included in a meta-function programming technique of the present invention.
Figure 2B:
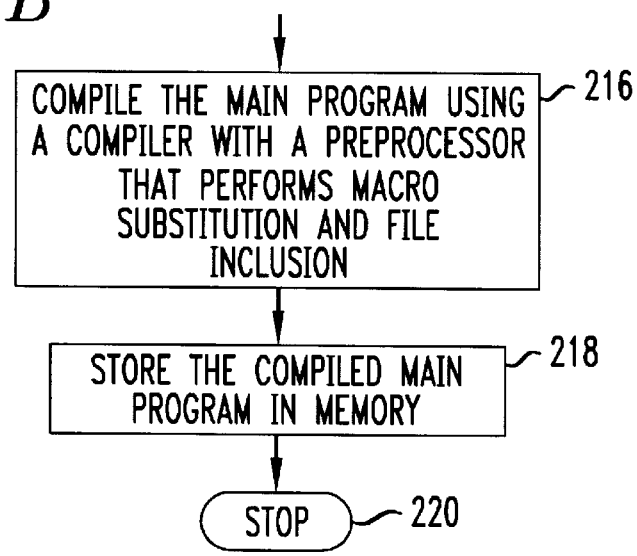

FIGS. 2A and 2B collectively illustrate a meta-function programming method of the present invention whereby the above described functionality can be achieved using an existing language, e.g., the C++ language. The method illustrated in FIGS. 2A–2B will be explained with references to FIG. 3 which illustrates an example of a meta-function which is passed code as an argument.

Referring now to FIG. 2A, the programming method of the present invention begins with the start step 202. In this step, the computer system receives an input signal from, e.g., the user input device 170 indicating that a user, e.g., programmer, wants to create a new program. In response to this input, the processor 124 begins executing a program editor which may be included as part of the compiler 133 or as a separate application program 128. Once the processor 124 initializes the program editor, operation progresses to step 204.

Figure 3:
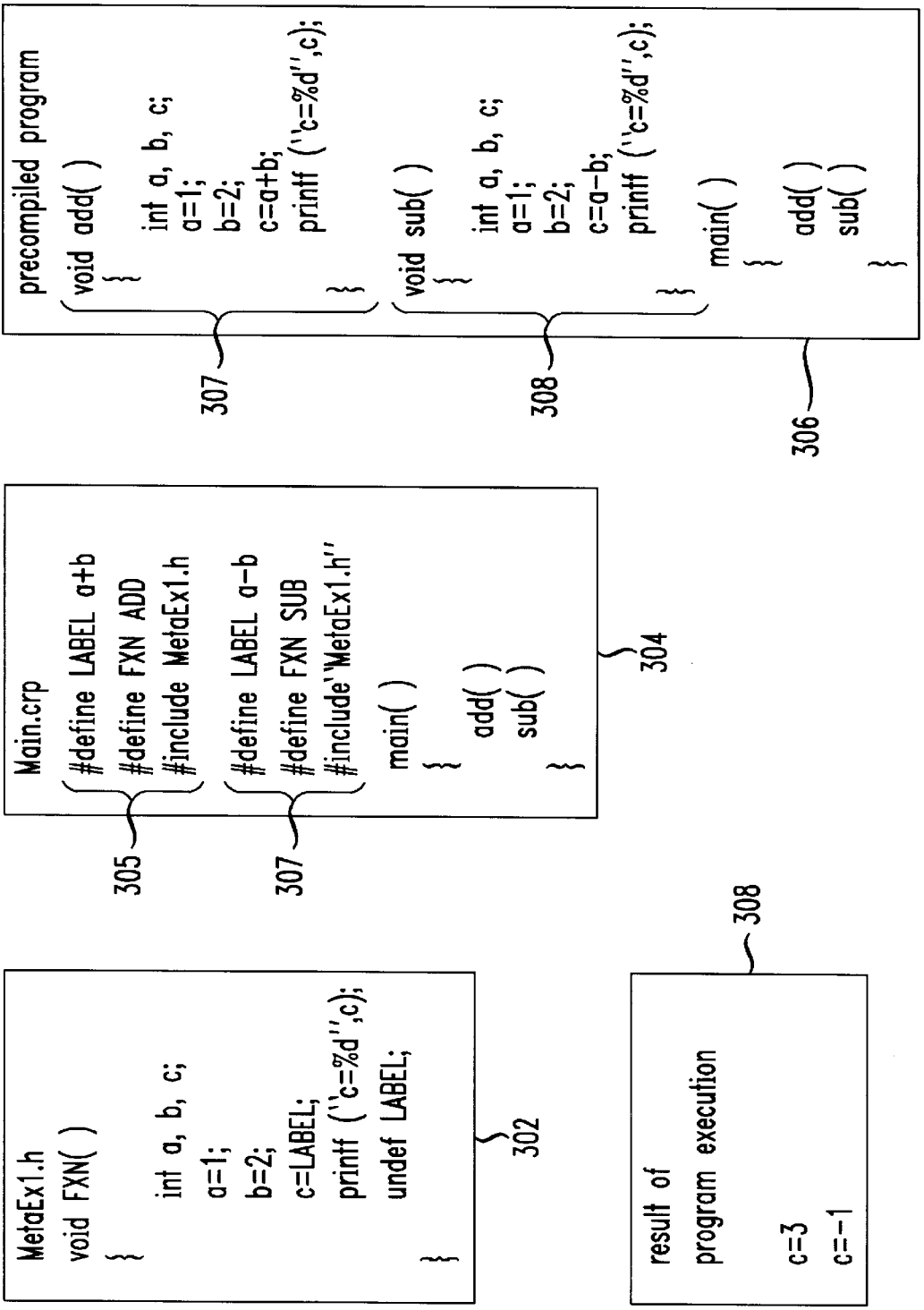
FIG. 3 is a diagram of an exemplary meta-function, program segment and precompiled program generated by performing the steps illustrated in FIGS. 2A and 2B as well as the result of executing the program illustrated in FIG. 3.

In step 204, the programmer, using the computer system 120, generates a function routine, e.g., representing a meta-function such as that illustrated in block 302 of FIG. 3, which includes one or more undefined labels representing code arguments.

Figure 4:
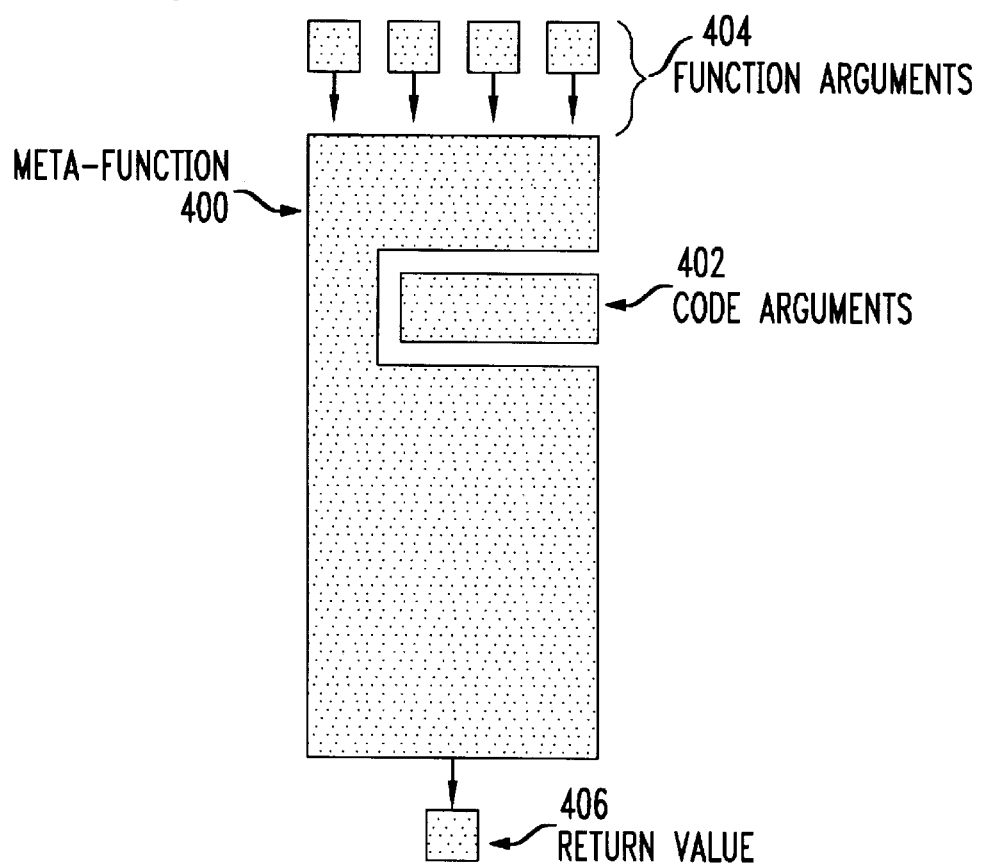
FIG. 4 is a graphical representation of a meta-function implemented in accordance with one embodiment of the present invention.

A graphical representation of a meta-function generated in step 204 is illustrated in FIG. 4. The meta-function 400 receives standard function arguments 404, one or more code arguments 402, and returns a value 406, e.g., void. The code argument labels are left undefined in the meta-function. Referring now to FIG. 3, in block 302 the relatively simple meta-function MetaEx1.h is illustrated. Note that this meta-function defines a function with the name FXN which returns a value which is void. For purposes of the FIG. 3 example, no function arguments are passed to the meta-function as indicated by the empty ( ) following FXN. However, it should be understood that standard function arguments may be passed to such a meta-function if desired as illustrated in FIG. 4. In MetaEx1.h the code argument label LABEL is used but not defined. While the code argument label LABEL is not defined in MetaEx1.h, at the end of FXN it is undefined in accordance with common programming practice since its use is complete for the particular function. This operation is merely a matter of good programming practice so that the label LABEL can be reused.

Referring again to FIG. 2, after the meta-function is generated in step 204, in step 206 it is saved in memory 126. Operation then progresses to step 208 wherein a program segment is generated. This program segment may be part of, e.g., a main program being generated such as Main.crp illustrated in block 304 of FIG. 3. The generated program segment, e.g., segment 305 of FIG. 3, includes one or more compiler directives, e.g., # define directives, that define the code argument label(s) used in the previously generated meta-function. These definition directives are followed by a compiler directive, e.g., an # include directive, which instructs a compiler to include the previously generated meta-function, e.g., MetaEx1.h, in the program segment being generated before the compilation operation is performed.

From step 208, operation progresses to step 210 which involves repeating step 208 as many times as desired for a particular application. Thus, in step 210 the previously generated meta-function is reused one or more times. With each reuse of the meta-function, a different code argument can be passed to the meta-function via the definition assigned to the label(s) used in the meta-function. A new name may also be assigned to the function created by re-including the meta-function.

Consider for example, Main.crp 304 illustrated in FIG. 3. In step 208 program segment 305 is initially generated. This segment passes the code argument "a+b" to MetaEx1.h by defining LABEL as "a+b". Program segment 305 also renames FXN as the function ADD thereby creating an ADD function in Main.crp using the meta-function MetaEx1.h.

In step 210, step 208 is repeated. In the example of FIG. 3 this results in the second program segment 307 being generated. This segment 307 passes the code argument "a−b" to MetaEx1.h by defining LABEL as "a−b". Note that this effectively alters the functionality of FXN which is defined in program segment 307 as the function "SUB" to reflect the operation performed by the newly created function.

Operation progresses from step 210 to step 212. In step 212, the generated program segments are arranged to generate a main program suitable for compilation. This may involve e.g., combining the previously generated program segments into a single file and adding additional program segments including, e.g., standard functions.

Figure 5:
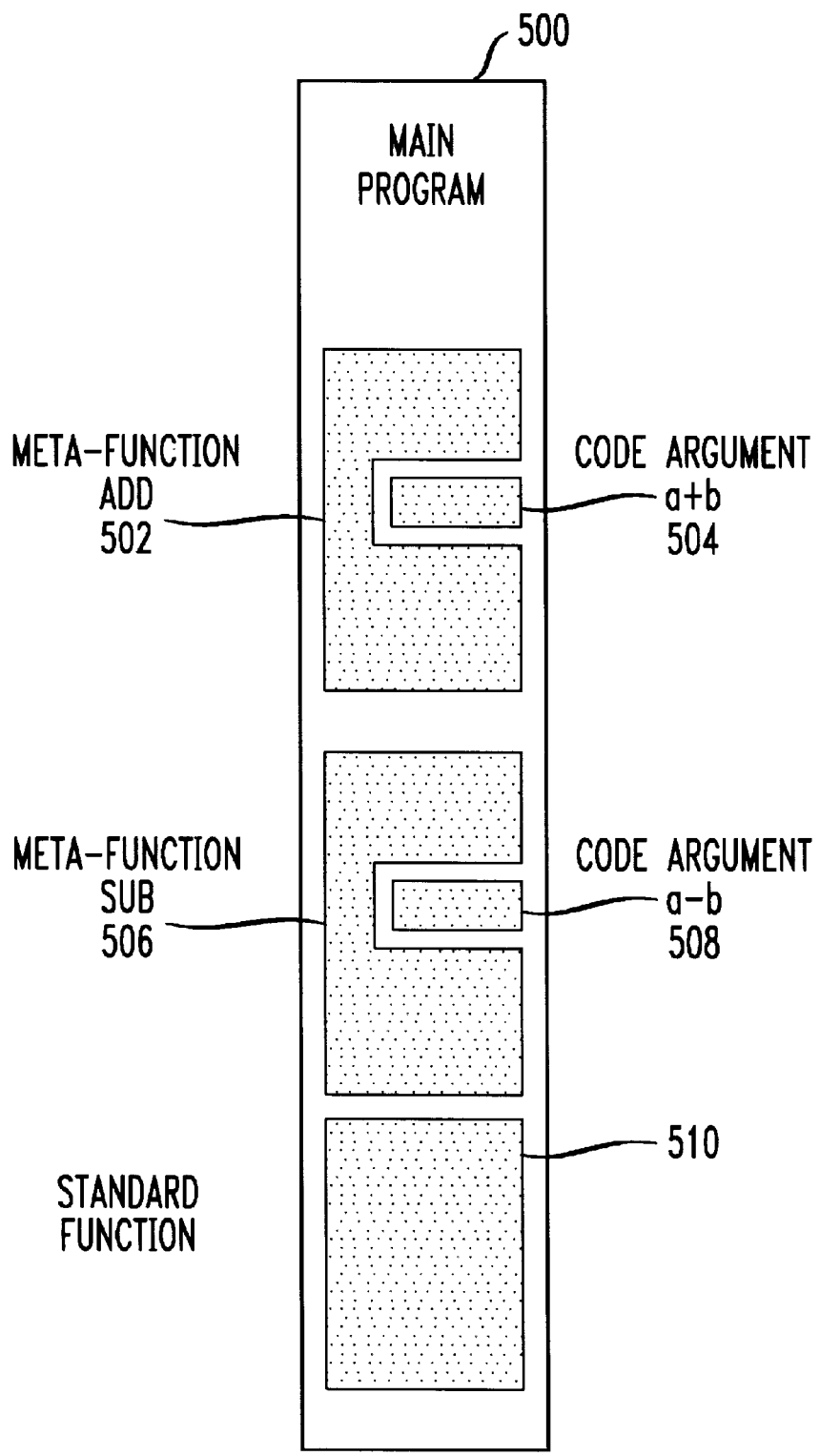
FIG. 5 is a graphical representation of a main program generated in accordance with the meta-programming techniques of the present invention.

FIG. 5, illustrates a main program 500 generated in accordance with step 212. The main program 500 includes the meta-function ADD 502 which incorporates the code argument a+b 504, the meta-function SUB 506 which incorporates the code argument a−b 508 and a standard function 510.

After the main program is generated in step 212 of FIG. 2A, in step 214 it is stored in the memory 126. Operation then progresses to step 216 wherein the processor 124 compiles the main program using the compiler 133. The compilation operation is generally performed in two steps. First the compiler processes the program being compiled in response to the compiler directives included in the program. In this portion of the compilation process, the code substitutions and other operations specified by the compiler directives are performed to generate what is referred to as a "preprocessed program". The preprocessed program is then compiled to generate object code which is used to control the processor 124 to perform the desired processing operation, e.g., image processing operation.

After compilation, the compiled program is stored in memory 126 as indicated in step 218, e.g., in the applications segment thereof, and the method is completed as indicated by the stop step 220.

Referring once again to FIG. 3, block 306 illustrates the preprocessed program resulting from the first step of the compilation of the program Main.crp. As illustrated, the # preprocessed program includes two distinct functions, the ADD function and the SUB function both of which were created using the original meta-function MetaEx1.h. Note how the code argument a+b was substituted by the compiler for the first occurrence of LABEL while a−b was substituted for the second occurrence of LABEL as a result of the # define directives. Note also how the use of the # include directives resulted in the inclusion of the MetaEx1.h code in the preprocessed program 306.

The result of executing the stored program produced as a result of preprocessing and compiling Main.crp 304 is illustrated in block 308. Note the difference in the value of c caused by the alteration of the functionality of the meta-function MetaEx1.h achieved though the use of two different code arguments, first a+b and then a−b.

While the above described example of a meta-function is a relatively simple one, it can be appreciated that the meta-function programming technique of the present invention can be used to generate far more complicated functions which will be included in a program at compilation time as opposed to run time.

A slightly more complicated example of a meta-function which uses template arguments to provide greater programming flexibility will now be described.

In accordance with the present invention, a C++ compatible meta-function can be generated by placing the following code within a file called "PrintCalculation.h":

```
template <class TYPE1, class TYPE2>
void FunctionName (TYPE1 variable1, TYPE2 variable2)
{
    // this is an example of a meta function which
    // uses templated arguments, as well as code arguments
    // print the original values
    cout << variable1 << " " << variable2 << " ";
    // apply some unknown block of code
    CodeArgument1;
    // print the intermediate values
    cout << variable1 << " " << variable2 << " ";
    // apply another unknown block of code
    CodeArgument2;
    // print the final values
    cout << variable1 < " " << variable2 << EOL;
}
#undef FunctionName
#undef CodeArgument1
#undef CodeArgument2
```

The meta-function can then be used by generating a program segment which uses the following series of # defines to pass code arguments to the meta-function followed by an # include directive to instantiate the meta-function:

```
#define FunctionName SumSqrAndSqrtSumSqr,
#define CodeArgument1 { variable1 *= variable1;
   variable2*= variable2; }
#define CodeArgument2 { variable1 += variable2; variable2 =
sqrt(variable1); }
#include "PrintCaculation.h"
```

The above program segment effectively produces a function titled SumSqrAndSqrtSumSqr using the meta-function "PrintCalculation.h".

In addition to generating the function SumSqrAndSqrtSumSqr, the meta-function "PrintCalculation.h" can be used in accordance with the present invention to generate other similar functions.

Consider the following program which uses three program segments each of which uses the meta-function "PrintCalculation.h":

```
#include "stdio.h"
#include "conio.h"
#define FunctionName SumSqrAndSqrtumSqr,
#define CodeArgument1 { variable1 *= variable1;
   variable2*= variable2; }
#define CodeArgument2 { variable1 += variable2; variable2 =
sqrt(variable1); }
#include "PrintCaculation.h"
#define FunctionName AverageAndVariance,
#define CodeArgument1 ( TYPE1 temp = variable2; \
   variable2 = sqr(variable1) + sqr(variable2);\
   variable1 += temp;
#define CodeArgument2 { variable1 /= 2;\
   variable2 = variable2/2 − sqr(variable1); }
#include "PrintCaculation.h"
#define FunctionName SqrAndCube,
#define CodeArgument1 { variable2 = variable1; \
   variable1 *= variable1; }
#define CodeArgument2 { variable2 *= variable1; }
#include "PrintCaculation.h"
void main(void)
{
   SumsqrAndSqrtSumSqr(6, 8);
   AverageAndVariance(6, 8);
   SqrAndCube(6, 8);
}
```

The output the above program at execution time, after it has been compiled will be:

| 6 | 8 | 36 | 64  | 100 | 10  |
|---|---|----|-----|-----|-----|
| 6 | 8 | 14 | 100 | 7   | 1   |
| 6 | 8 | 36 | 6   | 36  | 212 |

Though the above program, which uses the meta-function "PrintCalculation.h" multiple times, is more manageable and compact than copying the main body of the function "PrintCalculation.h" three times, the more significant advantage of the programming method of the present invention relates to the use of a single block of code, e.g., the meta-function, to provide common functionality to all the functions in the group of functions which use the meta-function. Changes to the functionality, e.g., to correct bugs, can be easily made in a uniform manner to all the functions in the group by merely modifying the meta-function.

Consider, for example, changing the format for the output of the three above described functions generated using "PrintCalculation.h". In accordance with the method of the present invention, to change the print format of the three functions all we need to do is modify the single file "PrintCalculation.h" and the changes are automatically incorporated into each of the three functions generated therefrom. For example if we change the meta-function "PrintCalculation.h" to:

```
template <class TYPE1, class TYPE2>
void FunctionName (TYPE1 variable1, TYPE2 variable2)
{
    // this is an example of a meta function which
    // uses templated arguments, as well as code arguments
    // print the function information
    cout << "Now entering function: "<< __FUNCTION__ <<"";
    // print the original values
    cout << "with initial arguments: "variable1
       << "and "<< variable2 << "."<< EOL:
    // apply some unknown block of code
    CodeArgument1;
    // print the intermediate values
    cout << "The intermediate values are: " variable1
       << "and " << variable2 << "." << EOL;
    // apply another unknown block of code
    CodeArgument2;
    // print the final values
    cout << "The resulting values are: "variable1
       << "and " << variable2 << "." << EOL << EOL;
}
#undef FunctionName
#undef CodeArgument1
#undef CodeArgument2
```

The output at execution time becomes:

```
    Now entering function SumSqrAndSqrtSumSqr with initial
arguments 6 and 8.
    The intermediate values are: 36 and 64.
    The resulting values are: 100 and 10.
    Now entering function AverageAndVariance with initial
arguments 6 and 8.
    The intermediate values are: 14 and 100.
    The resulting values are: 7 and 1.
    Now entering function SqrAndCube with initial arguments 6
and 8.
    The intermediate values are: 36 and 6.
    The resulting values are: 36 and 212.
```

As discussed above, while various compiled programming languages provide a mechanism for multiple executions of the same code, e.g., using a standard looping mechanism such as a "for" or "while" loop, they fail to provide an explicit mechanism for reusing meta-function code repeatedly for several different instantiations of functions specified prior to compilation.

Having described the meta-function programming technique of the present invention, meta-loops will now be discussed. A meta-loop is a programming device which allows for the generation of unrolled loops of repeated code prior to compilation. This is in sharp contrast to conventional programming techniques where code is executed a variable number of times at run time. In accordance with the present invention the actual number of times the code is repeated can be specified, e.g., in a header of a main program, just before compilation. Accordingly, the number of loops need not be specified at the initial programming time as long as the number of loops is specified at or before compile time. By using the above described meta-function programming techniques in combination with the meta-loop programming techniques of the present invention, the functionality of the code being repeated can be varied, e.g., each time a meta-loop is called. This provides an extremely efficient and flexible way to reuse code.

Figure 6:
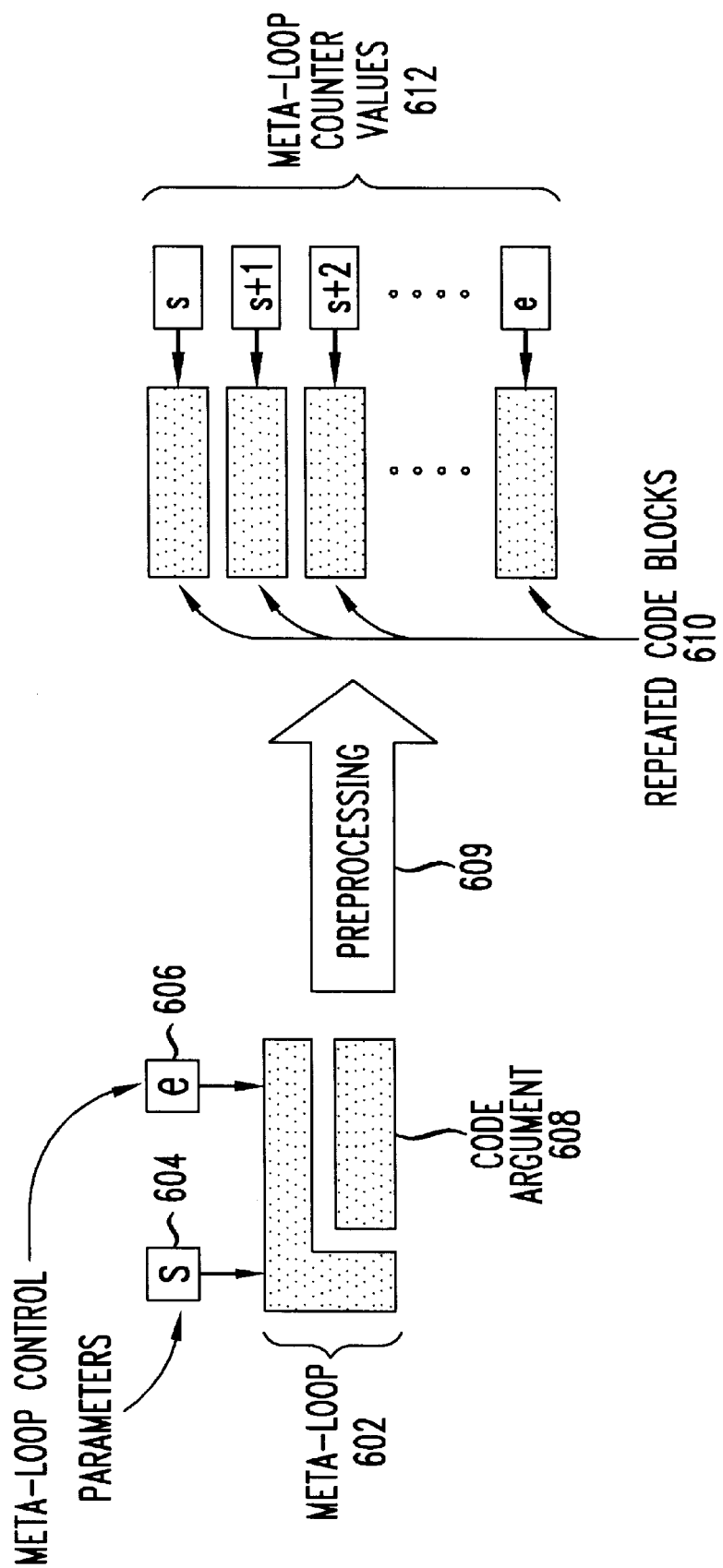
FIG. 6 is a graphical representation of a meta-loop implemented in accordance with a meta-loop programming technique of the present invention and the repeated code blocks generated by preprocessing the illustrated meta-loop.

FIG. 6 graphically illustrates a meta-loop 602, and the repeating blocks of code generated via a preprocessing operation 609 as a result from using the meta-loop 602. As illustrated, the meta-loop receives control parameters s 604 and e 606, which represent meta-loop start and meta-loop end counter values, respectively, and a code argument 608. Although a single code argument 608 is illustrated, multiple code arguments may be used with the meta-loop 602. The meta-loop 602 may also receive standard function arguments in addition to the illustrated code argument 608. The meta-loop control parameters are specified, e.g., in a main program file before compilation using e.g., # define compiler directives. As a result of the preprocessing process 609, repeated blocks of code 610 beginning with the starting value specified by the meta-loop control parameter s and ending with the meta-loop control parameter e are generated. The repeated code blocks 610 need not be identical since they can be implemented to incorporate different code arguments, e.g., as a function of the control parameters, e.g., the first of the repeated code blocks may implement a function LABEL1, the second may implement a function LABEL2, . . . and the last LABELEND. The illustrated meta-loop counter values 612 each correspond to a different iteration of the meta-loop code and, as will be discussed below, are achieved in one exemplary embodiment through the use of conditional compiler pre-processor directives as opposed to an incrementing counter routine.

Figure 7A:
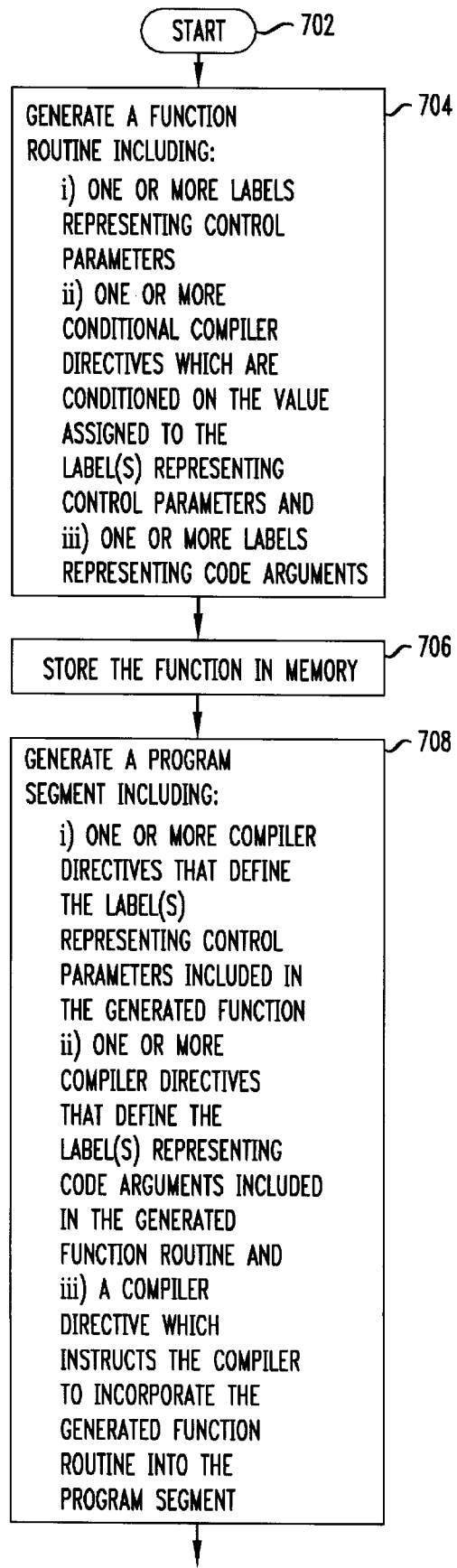
FIGS. 7A and 7B collectively illustrate steps included in a meta-loop programming technique of the present invention.
Figure 7B:
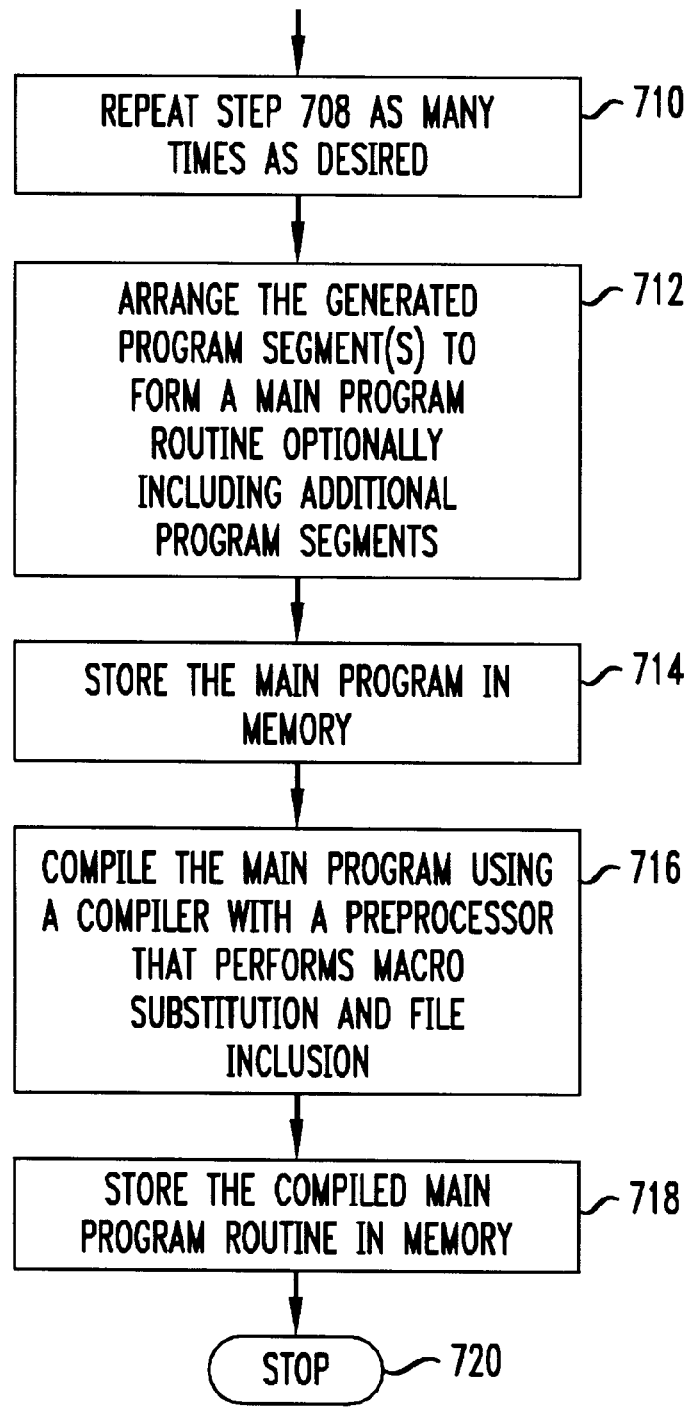
Figure 9:
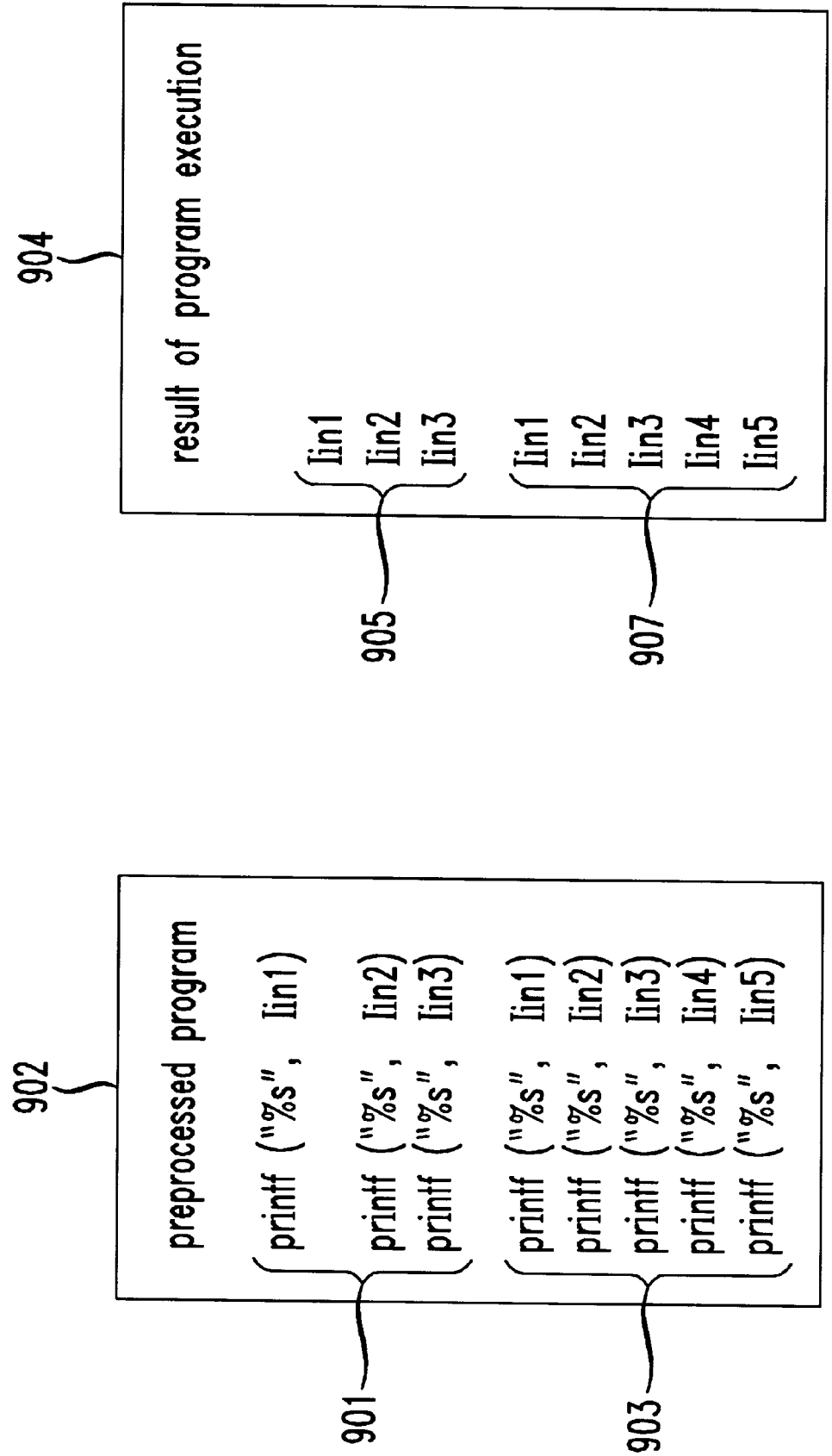
FIG. 9 illustrates the result of preprocessing, compiling and executing the main program illustrated in FIG. 8.

FIGS. 7A and 7B are a flow chart collectively illustrating a programming method for implementing a meta-loop in accordance with one embodiment of the present invention. The method illustrated in FIGS. 7A and 7B will now be described with reference to FIGS. 8 and 9.

The meta-loop programming method of the present invention illustrated in FIGS. 7A and 7B begins with the start step 702. In this step, the computer system 120 receives an input signal from, e.g., the user input device 170 indicating that the programmer wants to create a new program or program segment. In response to this input, the processor 124 begins executing the program editor application if it is not already executing.

From step 702, operation progresses to step 704, wherein a meta-loop function routine, e.g., the routine 802 is generated. The generated function routine includes one or more labels representing control parameters, e.g., loop start and loop end parameters. For example, function 802 includes the label MetaLoopEnd which represents a control parameter used to determine the number of loop iterations to be performed. For purposes of providing a simplified example, the loop counter always beings at one and no control parameter is used to determine the starting point of the loop.

In addition to the label(s) representing control parameters, the function generated in step 704 includes one or more conditional compiler directives used to effectively implement a loop counter without having to actually use a counter routine. Consider for example, the function 802 which includes the conditional compiler directives # if and # else. A set of such conditional compiler directive is used to implement each one of the possible iterations of the meta-loop upto the maximum number of supported iterations represented by MaxNumLoops. The maximum number of loop iterations supported by a meta-loop is normally determined at the time the meta-loop function 802 is created. Accordingly, MaxNumLoops represents a fixed integer number normally determined when the meta-loop is created.

The # if statement involves a testing of the loop start and end conditions. In the function 802, since only an end parameter MetaLoopEnd is used, only this parameter needs to be analyzed in the # if condition statement to determine if a block of code representing an iteration of the loop should be included in a program calling the meta-loop through, e.g., the use of a # include compiler directive.

If the loop conditions are satisfied, the code immediately following the # if statement will be processed, e.g., a function corresponding to the iteration of the loop represented by the # if statement will be defined using a label which represents a code argument. However, if the loop condition is not satisfied, the code immediately following the # else statement will be processed instead and this code will define the function to be null. After the conditional statements, each of the individual functions corresponding to one of the iterations of the loop is recited. Consequently, the functions, defined as corresponding to labels, include the code corresponding to the label. Functions defined as null will contribute no code to the compiled program.

After the meta-loop function, e.g., Meta_forEx1.h 802, is generated in step 704, it is stored in memory, e.g., in a separate file titled Meta_forEx1.h which can be incorporated into subsequently generated programs, e.g., through the use of a # include compiler directive. The storing of the meta-loop function occurs in step 706.

From step 706 operation progresses to step 708 in which a program segment 805 is generated. The program segment includes one or more compiler directives, e.g., # define directives, that define labels used as control parameters, e.g., MetaLoopEnd, used in the previously generated meta-loop 802. The first line of program segment 805 serves this purpose by defining MetaLoopEnd to be 3.

The program segment generated in step 708 also includes one or more compiler directives, e.g., # define directives, which define the label(s) in the previously generated meta-loop function representing code arguments. In this manner, code arguments are passed from the program segment to the meta-loop. In program segment 805, the second line of code performs this operation. Note the use of the concatenation compiler directive ## in the code argument being passed to the meta-loop, e.g., in line 2 of program segment 805. The use of this compiler directive increases the versatility of the programming technique of the present invention.

In addition to defining meta-loop control parameters and meta-loop arguments, the program segment 805 generated in step 708 includes a compiler directive, e.g., a # include directive, which instructs the compiler to incorporate the generated meta-loop function. The third line of program segment 805 performs this function and instructs a compiler to include the meta-loop function Meta_forEx1.h 802 into program segment 805.

From step 708, operation progresses to step 710 in which step 708 is repeated as may times as desired. In this manner, the meta-loop Meta_forEx1.h is used repeatedly. Program segment 807 represents a program segment which is generated by repeating step 708. Note that in program segment 807, the control parameter MetaLoopEnd is set to 5 in order to generate 5 iterations of code as opposed to 3. While the code argument passed to the meta-loop function is the same in the example of FIG. 8, this need not be the case.

From step 710 operation progresses to step 712 wherein the program segments are arranged to form a main program routine which optionally includes, e.g., additional program segments, standard functions and program headers.

After the main program is generated in step 712, in step 714 it is stored in the memory 126. Operation then progresses to step 716 wherein the processor 124 compiles the main program, e.g., Main.crp 804 using the compiler 133. As previously discussed, the compilation process is performed in two steps with the compiler processing the compiler directives included in the program being compiled in the first step. The preprocessed program resulting from the code substitutions, conditional compiler operations, and file inclusions performed by the compiler 133 on the program Main.crp is illustrated in block 902 of FIG. 9.

As can be seen, as a result of the meta-loop being used twice in the program Main.crp, with a different control parameter being used each time, the code argument passed to the meta-loop is repeated in the preprocessed program a different number of times each timer the meta-loop is used. The number of times the code argument is repeated corresponds to the number of times specified by the control parameter MetaLoopEnd passed to the meta-loop Meta_forEx1.h 802. As a result of setting MetaLoopEnd to three the first time Meta_LoopEx1.h is used results in the first three lines of code, 901, being generated while setting MetaLoopEnd to five the second time Meta_LoopEx1.h is used results in the five lines of code, 903, being generated.

After generation of the preprocessed program 902, as shown in step 716, the preprocessed program is compiled into object code representing the compiled program. In step 718 the compiled program is stored in the memory 126, e.g., in the applications segment thereof and the method is completed as indicated by the stop step 720.

The result of executing the program produced by compiling Main.crp 804 is illustrated in block 904. Note the first three lines 905 result from the initial use of the meta-loop Meta_ForEx1.h and the subsequent 5 lines 907 result from the second use of the meta-loop Meta_ForEx1.h. Note also how the use of the concatenation compiler directive allowed the number representing the loop iteration to be concatenated to Iin.

A slightly more complicated example of Meta-loop programming will now be discussed using an example directly applicable to an image processing application which performs operations on pixel data stored as a function of the pixel's row and column coordinates within an image.

As discussed above, in image processing applications there are occasions where it is desirable to be able to force a compiler to generate a block of code multiple times, e.g., when making a function which will have a fixed number of input arguments which is to be determined after the time the function is generated but before compilation time.

A meta-loop construction can provide such desired functionality if it is supported by a compiler's syntax. One example of a possible hypothetical syntax for a meta-loop is:

```
Image SumImages(const Image &image0
    MetaLoop(n=1; n<NumberOfImages; n++)
    ( , const Image &image##n ))
{
    Image imageResult;
    imageResult.Allocate(image1.Shape())
    for (int col=0; col<image0.NCols(); col++)
        for (int row=0; row<image0.NRows(); row++)
            MetaLoop(n=0; n<numberOfImages; n++)
            {
imageResult.Pixel(row,col)
    +=image##n.Pixel(row, col);
            }
}
```

If, say NumberOfImages were defined to be 5, this meta-loop would generate the code:

```
Image SumImages ( const Image &image0, const Image &image1
    const Image &image2, const Image &image3,
    const Image &image4)
}
    Image imageResult;
    imageResult.Allocate (image0.Shape ())
    for (int col=0; col<image0.NCols(); col++)
        for (int row=0; row<image0.NRows(); row++)
        }
            imageResult.Pixel (row,col) += image0.Pixel (row,col);
            imageResult.Pixel (row,col) += image1.Pixel (row,col);
            imageResult.Pixel (row,col) += image3.Pixel (row,col);
            imageResult.Pixel (row,col) += image4.Pixel (row,col);
        }
}
```

One advantage of using a meta-loop is that if, at some point, the number of images on which the function operates is to be changed, such change may be effected by simply changing the value of NumberofImages. No modification of the function code is required.

Unfortunately, C++ and other existing compiled languages do not presently support such meta-loops and incorporating a meta-loop operator would require a change to existing compilers and/or standards such as the C++ standard. By using the presently existing C++ "# include" and "# define" compiler preprocessor directives, the desired meta-loop functionality is achieved in accordance with the present invention without requiring any changes to existing C++ compilers. This functionality is achieved by placing a series of meta-loop control macros representing a meta-loop in a separate file and then using a series of # define's and # include compiler directives in the main program to achieve the functionality afforded by the above described hypothetical meta-loop syntax.

To generate a meta-loop in this image processing example, a series of macros, which either perform the operation defined by a code argument specified by a label, e.g., MetaLoop, or do nothing (depending on whether or not a control parameter in the macros is less than a specified end value, represented by MetaLoopEnd) are first defined within a file, e.g., the file "MetaLoop.h". For example the following code could be placed in a file called MetaLoop.h:

```
#if MetaLoopstart <= 1 && MetaLoopEnd >= 1
# define MetaLoopIteration1 MetaLoop(1)
#else
# define MetaLoopIteration1
#endif
#if MetaLoopstart <= 2 && MetaLoopEnd>=2
# define MetaLoopIteration2 MetaLoop(2)
#else
# define MetaLoopIteration2
#endif
#if MetaLoopStart <= 3 && MetaLoopEnd >= 3
# define MetaLoopIteration3 MetaLoop (3)
#else
# define MetaLoopIteration3
#endif
.
.
.
#if MetaLoopStart <= MetaLoopMax &&
MetaLoopEnd >= MetaLoopMax
# define MetaLoopIteration3 MetaLoop (3)
#else
# define MetaLoopIteration3
#endif
//where MetaLoopMax is a preselected constant, e.g., 20
MetaLoopIteration1 //instantiate macros
MetaLoopIteration2
MetaLoopIteration3
.
.
.
MetaLoopIterationMetaLoopMax
```

Having created a file MetaLoop.h with the above code and conditional compiler directives, macros, which include, e.g., a code argument which describes the action to be performed, and one or more control parameters which define the number of times the action described by the code argument is to be performed, are then defined. In this example:

```
#define MetaLoopStart 1          //define start control parameter
#define MetaLoopEnd NumberOfImages  //define end control parameter
#define MetaLoop(n) , const Image &image##n //define code argument
``` is defined for a first meta-loop to be used in an image processing program and;

```
#define MetaLoopStart 0
#define MetaLoopEnd NumberOfImages
#define MetaLoop(n) imageResult.Pixel(row,col) +=
    image##n.Pixel(row,col);
``` is defined for a second meta-loop to be included in the image processing program.

To instantiate a meta-loop function in accordance with the present invention one need only # include the "MetaLoop.h" file, e.g., after defining the control parameters and code arguments to be used with the meta-loop. For the above example, use of this technique to write an image processing program, e.g., Proc_Image.crp is as follows:

```
Image SumImages(const Image &image0
        #define MetaLoopStart 1
        #define MetaLoopEnd NumberofImages
        #define MetaLoop(n) , const Image &image##n
        #include "MetaLoop.h"
{
    Image imageResult;
    imageResult.Allocate (image0.shape ())
    imageResult=CopyOf (image)0;
    for (int col=0; col<image0.NCols(); col++)
      for (int row=0; row<image0.NRows(); row++)
      {
        #define MetaLoopStart 0
        #define MetaLoopEnd NumberOfImages
        #define MetaLoop(n) imageResult.Pixel(row1col) +=
            image##n.Pixel (row,col);
        #include "MetaLoop.h"
      }
}
```

As discussed above, by combining meta-functions and meta-loops, which are a particular type of meta-function, it is possible to produce an elaborate set of meta-functions which can be used, e.g., to generate optimized image processing and computer vision routines which reduce or avoid the delays associated with run time function calls. In accordance with the above discussed programming techniques of the present invention, meta-functions can allow a variable number of input images which can be specified at or just before compile time, different return types, access to the data of neighboring pixels, additional parameters and/or adjustable initialization.

Figure 10:
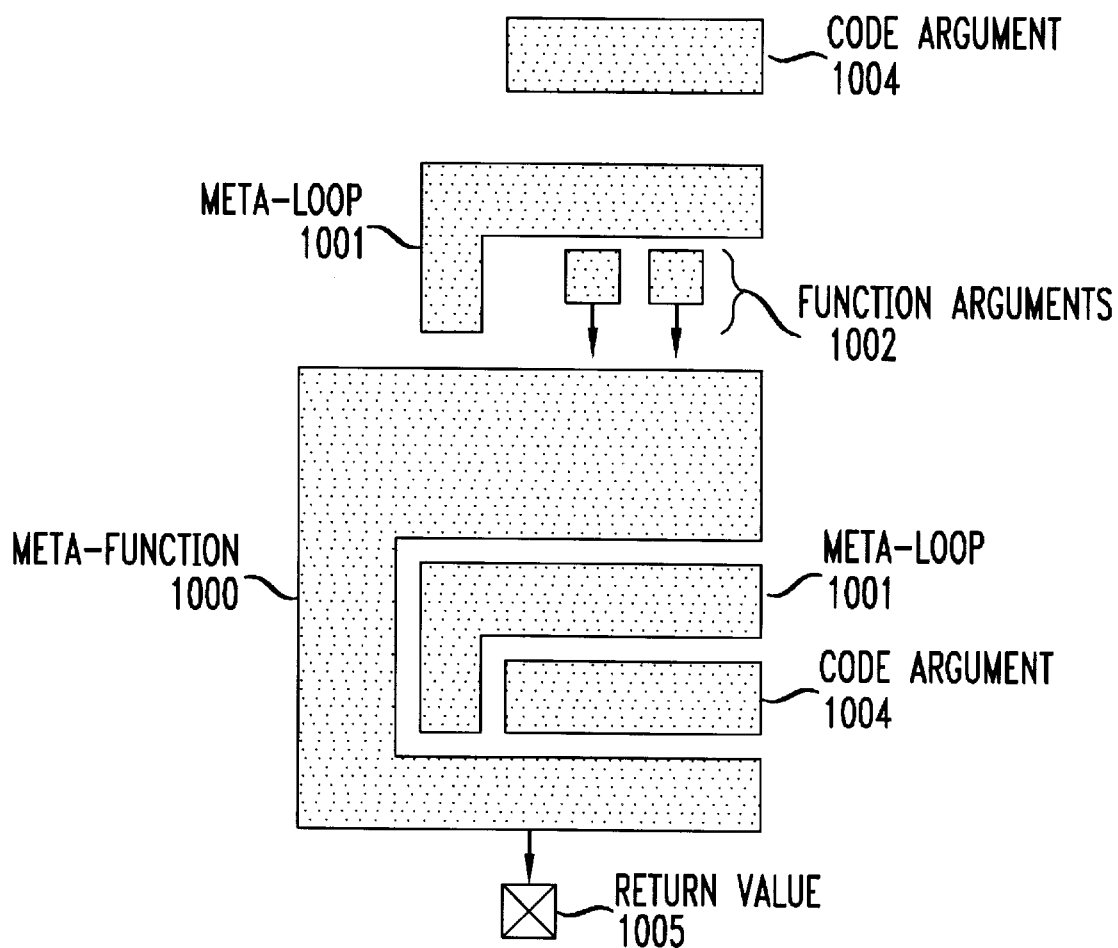
FIG. 10 is a diagram illustrating the combination of the meta-function and meta-loop programming techniques of the present invention.

FIG. 10 graphically illustrates a meta-function 1000 which receives a code argument 1004, a meta-loop 1001, and standard function arguments 1002 as illustrated.

Using the meta-function and meta-loop programming techniques of the present invention it is possible to generate a general image processing meta-function. For example, the following general image processing meta-function code could be generated using the above discussed meta-loop function MetaLoop.h, and could be placed in a file

```
Image FunctionName (const Image &image0
        #define MetaLoopStart 1
        #define MetaLoopEnd NumberofImages
        #define MetaLoop(n) , const Image &image##n
        #include "MetaLoop.h"
        )
{
    Image imageResult;
    imageResult.Allocate (image1.Shape ())
    for (int col=0; col<image0.NCols(); col++)
      for (int row=0; row<image0.NRows(); row++)
      {
        #define MetaLoopstart 0
        #define MetaLoopEnd NumberofImages
        #define MetaLoop(n) CodeArgument(n);.
        #include "MetaLoop.h"
      }
}
#undef CodeArgument
#undef NumberofImages
#undef FunctionName
```

Using the above exemplary general image processing meta-function, GeneralImageFunction.h, a host of different image-processing routines, e.g., in the form of program segments, can easily be generated.

For example, first consider the following program segment which will sum 5 images using the meta-function

```
#define FunctionName SumOf
#define NumberOfImages 5
#define CodeArgument(n) imageResult.Pixel(row,
    col)+=image##n.Pixel(row,col);
#include GeneralImageFunction.h
```

Also consider for example the following program segment which also uses use the same meta-function, GeneralImageFunction.h, to get the exclusive-or (XOR) of 7 images:

```
#define FunctionName XOROf
#define NumberOfImages 7
#define CodeArgument(n)
imageResult.Pixel(row,col)^=image##n.Pixel(row,col);
#include GeneralImageFunction.h
```

In addition GeneralImageFunction.h can be used to do alpha channel compositing as per the following exemplary program segment:

```
#define FunctionName XOROf
#define NumberofImage 7
#define CodeArgument(n) if (imageResult.Pixel(row,col).A()<1)\
    imageResult.Pixel(row,col)+=image##n.Pixel (row,
    col).A()*image##n.Pixel(row,col);
# include GeneralImageFunction.h
```

The above discussions of exemplary embodiments of the present invention describe generating a meta-function routine and storing it in memory, e.g., in a file, before the creation of program segments which utilize the generated meta-function. However, the order of the creation of the program segments which use a meta-function and the creation of the meta-function itself is not critical to the invention. Accordingly, a meta-function may be generated after a program segment which uses the meta-function so long as both the program and meta-functions used therein exist prior to preprocessing of the program.

While the present invention has been illustrated with reference to exemplary embodiments, those skilled in the art will appreciate that various changes in form and detail may be made without departing from the intended scope of the present invention as defined in the appended claims. Because of the variations that can be applied to the illustrated and described embodiments of the invention, the invention should be defined with reference to the appended claims.

What is claimed is:

1. A method of programming a computer comprising the steps of:
   generating a first function routine including a first label representing a code argument; and
   generating a first program segment including:
   i. a first directive which defines the first label to be a first block of code; and
   ii. a second directive which instructs a preprocessor to include the first function routine into the first program segment after the first directive.

2. The method of claim 1, wherein the first directive is a compiler directive, the method further comprising the step of:
   generating a second program segment including,
   i. a third compiler directive which defines the first label to be a second block of code; and
   ii. includes a fourth directive which instructs the preprocessor to include the first function routine into the second program segment after the third compiler directive.

3. The method of claim 2, further comprising the steps of:
   storing the first function routine in a first file;
   storing the first and second program segments in a second file; and
   compiling the contents of the second file including the first and second program segments to generate a compiled program therefrom.

4. The method of claim 3,
   wherein the step of generating a first function routine includes the step of generating function name label; and
   wherein the step of generating a first program segment includes the step of:
   generating a directive which instructs the preprocessor to substitute a function name for the first function name.

5. The method of claim 2,
   wherein the step of generating the first function routine includes the step of generating a function name label; and
   wherein the step of generating a first program segment includes the step of:
   generating a directive which instructs the preprocessor to substitute a function name for the first function name.

6. The method of claim 1, further comprising the steps of:
   generating an $n^{th}$ program segment, where n is a positive integer greater than one, the $n^{th}$ program segment including,
   i. an additional compiler directive which defines the first label to be an $n^{th}$ block of code; and
   ii. includes a further additional directive which instructs the preprocessor to include the first function routine into the $n^{th}$ program segment, and
   repeating the step of generating an $n^{th}$ program segment multiple times to generate a plurality of program segments.

7. The method of claim 6, further comprising the steps of:
   generating a standard function routine without including a compiler directive in the standard function routine; and
   arranging the generated first through $n^{th}$ program segments and standard function routine into a main program.

8. The method of claim 7, further comprising the steps of:
   storing the first function routine in a first file;
   storing the main program in a second file; and
   compiling the main program.

9. The method of claim 8,
   wherein the step of generating a first function routine includes the step of generating a function name label; and
   wherein the step of generating a first program segment includes the step of:
   generating a directive which instructs the preprocessor to substitute a function name for the first function name.

10. The method of claim 9,
    wherein the first directive is a # define compiler directive; and
    wherein the second directive is a # include compiler directive.

11. The method of claim 8,
wherein the main program is an image processing program.

12. The method of claim 1, wherein the step of generating a first program function routine includes the steps of:
generating and including in the first function routine a first undefined control parameter label indicative of a number of code argument iterations to be performed;
generating and including in the first function routine a plurality of conditional compiler directives which are a function of the first control parameter label.

13. The method of claim 12, wherein the step of generating the first program segment includes the step of:
generating and including in the first program segment a directive which instructs the preprocessor to define the first control parameter to a preselected integer value.

14. The method of claim 1, wherein the step of generating a first program function routine includes the steps of:
generating and including in the first function routine a first undefined control parameter label indicative of a loop starting point and a second undefined control parameter label indicative of a loop ending point, the loop starting and ending points being used to control the number of code argument iterations to be performed;
generating and including in the first function routine a plurality of conditional compiler directives which are a function of the first and second control parameter labels.

15. The method of claim 14, wherein the plurality of conditional compiler directives include sets of if compiler directives and else compiler directives, one set of if and else compiler directives being included for and corresponding to each potential iteration of the code argument.

16. The method of claim 14, wherein a block of code after each if compiler directive defines, as a function of the first label, a function associated with the code iteration to which the if compiler directive corresponds.

17. The method of claim 16, wherein a block of code after each else compiler directive defines a function associated with the code iteration to which the else compiler directive corresponds to nothing.

18. The method of claim 17, wherein the step of generating the first function routine further comprises the step of:
generating and including in the first function routine code which instantiates the functions associated with the if and else compiler directions.

19. The method of claim 18, wherein the step of generating the first program segment includes the step of:
generating and including in the first program segment a pair of compiler directives, instructing the preprocessor to define the first and second control parameter labels to preselected values.

20. The method of claim 19, wherein the first block of code to which the first label is defined is a function which accepts an additional block of code as an argument.

21. The method of claim 20, wherein the step of generating a first program segment includes the step of:
using a concatenate compiler directive in conjunction with the first compiler directive which defines the first label.

22. The method of claim 14, wherein the step of generating a first program segment includes the step of:
using a concatenate compiler directive in conjunction with the first compiler directive which defines the first label.

23. The method of claim 14, wherein the first block of code to which the first label is defined is a function which accepts an additional block of code as an argument.

24. A computer-readable medium comprising:
computer-executable instructions for performing the steps of claim 1 in response to input from a user of the computer readable medium.

25. The computer-readable medium of claim 24, further comprising:
computer-executable instructions for performing the additional steps recited in claim 14 in response to input from a user of the computer readable medium.

26. A system comprising:
a processor for executing computer programs;
a memory device coupled to the processor for storing files including program segments, computer programs and computer functions;
means for generating a first function routine including on undefined first label representing a code argument;
means for storing the first function routine in a first file;
means for generating a first program segment including:
a first compiler directive which instructs a compiler to replace subsequent occurrences of the first label in the first function routine with a first block of code; and
a second compiler directive which instructs a compiler to incorporate the contents of the first file into the first program segment.

27. The apparatus of claim 26, further comprising:
means for specifying a variable number of times the first block of code is to be iterated in the first function routine.

28. The apparatus of claim 27, further comprising:
means for compiling the first program segment to generate executable code therefrom.

29. The apparatus of claim 28, wherein the means for compiling the first program segment is an ANSI C compliant compiler stored in the memory.

30. The apparatus of claim 27, further comprising:
means for receiving and storing data representing an image; and
means for using the executable code to control the processor to perform an image processing operation on the stored data.

31. A method of programming a computer, comprising the steps of:
generating a function routine;
generating a code argument to be included in the function routine;
generating, subsequent to the generation of the function routine, a parameter indicating the number of times the code argument is to be repeated within the function routine;
generating, as a function of the code argument and the parameter, a computer program including the function routine, the function routine including the code argument repeated the number of times indicated by the control parameter.

* * * * *

UNITED STATES PATENT AND TRADEMARK OFFICE
CERTIFICATE OF CORRECTION

PATENT NO. : 5,905,894
DATED : May 18, 1999
INVENTOR(S) : Jeremy S. De Bonet

It is certified that error appears in the above-identified patent and that said Letters Patent is hereby corrected as shown below:

```
Column 8, line 50-51 --change "# preprocessed program"
        to "#preprocessedprogram"--

Column 9, line 24 --change "<" to "<<"--

Column 16, line 6 --after "MetaLoop.h" insert " } "--

Column 16, line 40 --after "file" insert
        "GeneralImageFunction.h:"--

Column 16, line 68 --after "meta-function" insert
        "GeneralImageFunction.h"--
```

Signed and Sealed this

Fourth Day of January, 2000

Attest:

Attesting Officer

*Acting Commissioner of Patents and Trademarks*